Nov. 3, 1970　　　W. I. LEHRER ETAL　　　3,538,371
GLOW DISCHARGE DISPLAY DEVICE WITH SUPPRESSOR PLATE
Filed June 4, 1968

SUPPRESSOR PLATE SPACING d

INVENTORS
WILLIAM I. LEHRER
DENNIS C. De FEVERE

BY
ATTORNEYS

United States Patent Office 3,538,371
Patented Nov. 3, 1970

3,538,371
**GLOW DISCHARGE DISPLAY DEVICE
WITH SUPPRESSOR PLATE**
William I. Lehrer, Los Altos, and Dennis C. DeFevere,
Palo Alto, Calif., assignors to Fairchild Camera and
Instrument Corporation, Syosset, N.Y., a corporation
of Delaware
Filed June 4, 1968, Ser. No. 734,266
Int. Cl. H01j *17/38*
U.S. Cl. 313—109.5                                 9 Claims

ABSTRACT OF THE DISCLOSURE

A suppressor plate, positioned a selected distance above cavities placed in a substrate, limits the glow discharge of an inert gas stored between the plate and the substrate to regions within and above the cavities, independent of the size, shape, and spacing of the electrodes on both sides of each cavity.

BACKGROUND OF THE INVENTION

Field of the invention

This invention relates to glow discharge display devices and in particular to a glow discharge display device in which the ionization of the discharge gas is limited, by use of a so-called "suppressor" plate, to cavities placed on at least one face of a substrate.

Description of the prior art

Glow discharge devices are well-known. Such devices are used in both digital and alphanumeric display panels for wide variety of electronic equipment. In a typical device, an inert gas is placed between two electrodes and a potential is applied across the electrodes. For a suitable potential the gas ionizes, creating a visible glow between the electrodes. The resolution of the symbols produced by the gas ionization in response to an applied voltage is essentially controlled by the electrode size, spacing and geometry. The glow discharge area is thus a compromise between convenient fabrication of electrodes and the desired resolution.

SUMMARY OF INVENTION

This invention makes it possible to accurately limit the area of a glow discharge in a glow discharge device and thereby to control the resolution of this discharge. According to this invention, a suppressor plate, located a selected distance from a substrate, limits gas ionization to regions above cavities placed on at least one surface of the substrate. This invention is based on the fact that the breakdown voltage of an inert gas decreases as a representative cavity dimension increases. Thus by first forming cavities of selected shapes and sizes in a dielectric substrate and then placing a neutrally charged suppressor plate above the cavities, the distance between the suppressor plate and the bottoms of the cavities can be selected to ensure that gas breakdown occurs only in and above the cavities. The visible pattern, dependent only on the cavity dimensions, is thus independent of electrode size and spacing.

In one embodiment of this invention, cavities are etched in a selected pattern on a substrate and electrodes of arbitrary geometry are deposited on the substrate on both sides of the cavities. A suppressor plate is then positioned over the etched cavities above the electrodes and is separated from the electrodes by dielectric spacers. Placed over the suppressor plate and sealed to the substrate is a leakproof housing. A selected inert gas is placed in the volume created by the housing and the substrate. When a voltage is applied to the electrodes, a glow discharge is obtained only in and above the cavities and not in the other regions between the glass plate and the substrate. As a result, a large amount of gas can be stored in the device between the substrate and the leakproof housing, giving the resulting display device a long life, while at the same time, the glow discharge can be limited to the etched cavities. Because these cavities can be accurately made, the resulting glow discharge pattern has excellent resolution.

DESCRIPTION OF THE PREFERRED EMBODIMENTS

Figure 1:
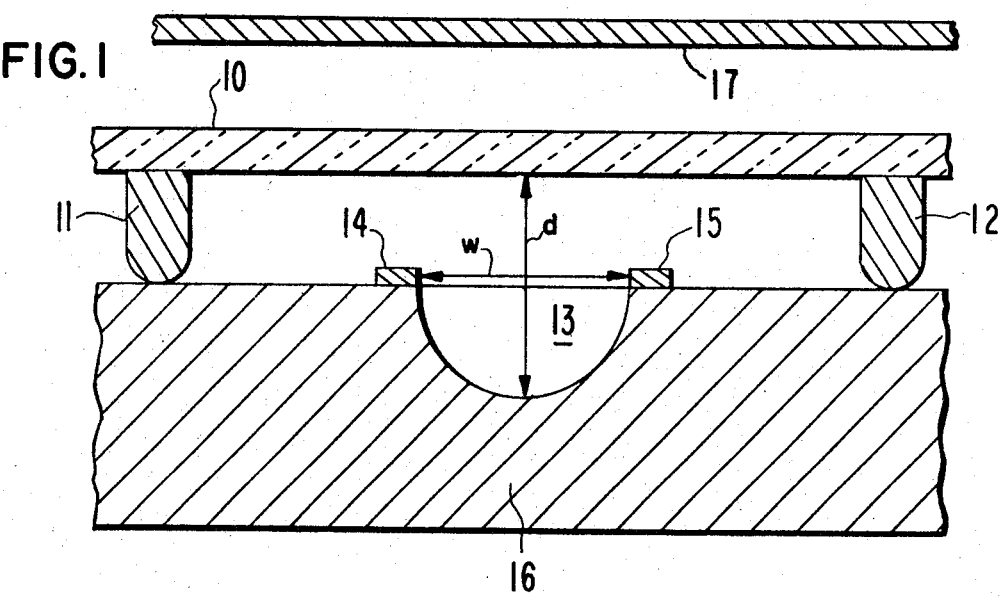
FIG. 1 shows a cross-section of a glow discharge device constructed using the principles of this invention.

FIG. 1 shows the cross-section of a typical cavity 13 in a glow discharge display device. On either side of cavity 13 are electrodes 14 and 15. One of these electrodes serves as the cathode and the other as the anode. Cavity 13 preferably is etched by well-known photolithographic techniques in glass substrate 16. Dielectric substrates other than glass can, of course, be used if desired. Also, cavity 13 can, if desired, be formed by methods other than etching, such a by sand blasting.

Placed above substrate 16 on dielectric spacers 11 and 12 is suppressor plate 10. Plate 10, likewise a dielectric such as glass, remains uncharged throughout the glow discharge of the gas stored in cavity 13. A leakproof cover 17, typically, though not necessarily, transparent, is positioned above suppressor plate 10 and in contact with substrate 16. A selected inert gas, typically neon, is placed in the volume formed by cover 17 and substrate 16 and the leakproof cover is sealed to the substrate by a glass to glass seal, or by an epoxy to glass or metal to glass seal, depending on the materials used. Processes for making such seals are well-known.

Figure 2:
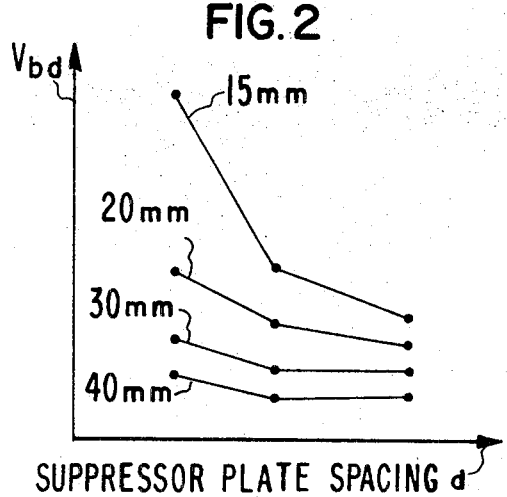
FIG. 2 shows the relationship betwen breakdown voltage and a selected dimension of the combined suppressor plate and cavity; and, FIG. 3 shows an isometric, cut-away view of a simple display device constructed using the principles of this invention.

The application of a voltage across electrodes 14 and 15 breaks down—that is, ionizes—the gas between plate 10 and substrate 16 within and above cavity 13. As shown in FIG. 2, the breakdown voltage $V_{bd}$ decreases as the spacing $d$ between the suppressor plate and the bottom of etched channel 13 (FIG. 1) increases. The several curves shown in FIG. 2 represent different values of the absolute pressure of the gas stored between plate 10 and substrate 16. As shown in this figure, the breakdown voltage varies inversely with the absolute pressure, given in terms of millimeters of mercury, of the glow discharge gas.

The application of a voltage to electrodes 14 and 15 (FIG. 1) results in the breakdown of the gas in cavity 13. Consequently, the resulting glow discharge appears as a fine line limited to cavity 13. Because the dimensions of cavity 13 can be accurately controlled by well-known photolithographic planar techniques, the resolution of the glow discharge can, in turn, be accurately controlled.

The nature of the phenomenon on which this invention is based is not completely understood. Studies, however, indicate that the gas stored in a glow discharge display device ionizes only when the mean free path of the ionized gas molecules is less than a critical dimension of the gas storage area.

Figure 3:
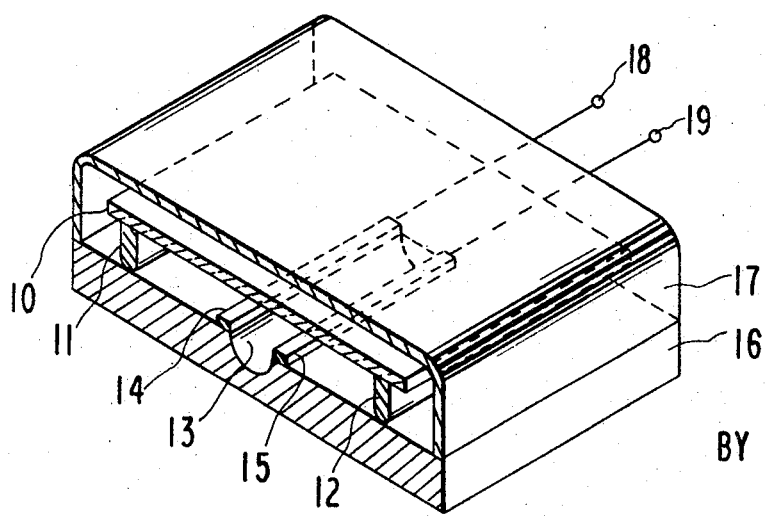

FIG. 3 shows a typical display device constructed using the principles of this invention. This device produces the digital number one (1) when excited by the correct voltage. To make this device, a plain glass substrate was masked with a photoresistant material—AZ resist. The photoresist was then removed by well-known techniques from those areas of the substrate on which it was desired to deposit electrodes. Aluminum electrodes were deposited on the exposed substrate by standard techniques. Selective removal of the photoresist material from between the pair of electrodes was followed by application of a hydrofluoric acid solution to the exposed glass substrate. The solution consisted of one part hydrofluoric acid to one part water. A trough or cavity approximately ½ mil thick and about one centimeter long with a shallow, substantially ellipsoidal, cross-section was etched by the hydrofluoric acid. Then the substrate was rinsed in water to remove the hydrofluoric acid and a glass suppressor plate was mounted on glass spacers which in turn were glued to the glass substrate. A leakproof, glass container or cover was placed over the glass suppressor plate and sealed to the glass substrate. A mixture of 70% neon and 30% helium under a pressure of 18 millimeters of mercury was placed in the container. The spacing $d$ between the glass suppressor plate and the bottom of the etched cavity was 1 mil. The spacing between the two aluminum electrodes on either side of the cavity and the width of the cavity was 30 mils. When a potential of approximately 200 volts was placed on the electrodes on either side of the cavity through terminals 18 and 19, a glow discharge occurred in the region within and above the etched cavity. Because the cavity width was 30 mils, this glow had a width of 30 mils.

Other structures embodying the principle of this invention will be obvious in view of this disclosure. In particular, several different patterns can be produced on the same substrate by etching several sets of cavities in the substrate, each set corresponding uniquely to one desired pattern. If several visible patterns are to be sequentially created, with the earlier-produced patterns remaining visible as other patterns are produced, the later-produced patterns can be created by ionizing gas in successively shallower sets of etched cavities. In this configuration, selected electrodes are interconnected and each new pattern is superimposed on the earlier visible patterns only when the breakdown voltage associated with the particular set of cavities corresponding to the new pattern is exceeded.

Moreover, while the embodiment of this invention has been described using a glass substrate and a glass suppressor plate, other dielectrics can be used for the substrate and suppressor plate. Of course, if the substrate, the suppressor plate and the leakproof cover are transparent, the display device can be viewed from either side, an advantage in some applications.

In addition, several parallel cavities can, if desired, be placed between one pair of electrodes. These cavities can be dimensioned so that the gas in and above these cavities ionizes either simultaneously or sequentially in response to a pre-programmed voltage applied to the electrodes. Sequential excitation of the gas in and above the cavities is cumulative; that is, gas previously ionized by a low breakdown voltage remains ionized as additional portions of gas are ionized by successively higher breakdown voltages.

While the suppressor plate has been described as flat, this plate can, of course, be shaped by any of several well-known techniques to create interesting and unique gas ionization patterns. Thus, by varying the distance $d$ (FIG. 1) between the suppressor plate and the bottom of an etched cavity as a function of distance along the cavity and then varying linearly the voltage applied to electrodes beside the cavity, the ionization region in the etched cavity can be made to grow or shrink with time.

Of interest, when the glow discharge is viewed through substrate 16, a brighter glow discharge pattern is seen by placing a reflective material on one face of suppressor plate 10.

Finally, in some situations, the suppressor plate and the leakproof cover can be one and the same. FIG. 3 with suppressor plate 10 and spacers 11 and 12 removed shows such a structure in cutaway, sectional view.

What is claimed is:

1. A glow discharge device comprising:
   a substrate containing cavities formed on at least one surface thereof;
   electrodes placed on said at least one surface on both sides of said cavities;
   at least one suppressor plate positioned above said at least one surface a selected distance above the bottoms of said cavities so as to limit any glow discharge to said cavities;
   a leakproof cover sealed to said substrate and enclosing said cavities and said at least one suppressor plate; and,
   a selected inert gas placed between said etched cavities and said at least one suppressor plate.

2. Apparatus as in claim 1 in which said substrate and said suppressor plate are made of a selected dielectric.

3. Apparatus as in claim 2 in which said selected dielectric is glass.

4. Apparatus as in claim 3 in which said inert gas is a mixture of neon and helium.

5. Apparatus as in claim 1 including terminals passing through said cover and contacting said electrodes.

6. A glow discharge display device comprising:
   a glass substrate containing on one surface thereof cavities arranged in selected patterns;
   electrodes selectively placed on the surface of said substrate on both sides of each of said cavities;
   a leakproof, glass cover sealed to said substrate and enclosing said cavities thereby creating a gas storage volume between said cover and said substrate;
   an inert gas placed in said volume;
   a glass suppressor plate positioned in said gas storage volume above said cavities so as to limit any glow discharge to the cavities; and
   selected terminals attached to said electrodes, said terminals passing through said glass cover for connection to an external power supply.

7. A glow discharge device comprising:
   a substrate containing cavities on a first face;
   electrodes selectively placed on said first face;
   a suppressor plate positioned above said first face so as to limit any glow discharge to said cavities;
   a leakproof cover sealed to said substrate and enclosing said cavities and said suppressor plate;
   an inert gas placed between said substrate and said cover; and,
   means for supplying a voltage to said electrodes.

8. A glow discharge device comprising:
   a substrate containing cavities on a first face;
   electrodes selectively placed on said first face;
   a combination leakproof cover and suppressor plate sealed to said substrate and enclosing said cavities, said suppressor plate limiting any glow discharge to said cavities;

an inert gas placed between said substrate and said cover; and, means for supplying a voltage to said electrodes.

9. Apparatus as in claim 8 in which a selected face of said combination leakproof cover and suppressor plate is coated with a reflective material thereby to enhance the visible pattern produced by the glow discharge of said inert gas when said pattern is viewed through said substrate.

References Cited

UNITED STATES PATENTS

| 1,731,889 | 10/1929 | Donle | 313—200 |
| 2,632,128 | 3/1953 | Hancock | 313—210 X |
| 3,346,759 | 10/1967 | Hardwick | 313—210 X |

ROY LAKE, Primary Examiner

P. C. DEMEO, Assistant Examiner

U.S. Cl. X.R.

313—199, 210